United States Patent

[11] 3,631,943

| [72] | Inventors | Elwood L. Roob<br>Parma;<br>Richard R. Schier, Bay Village, both of Ohio |
|---|---|---|
| [21] | Appl. No. | 21,662 |
| [22] | Filed | Mar. 23, 1970 |
| [45] | Patented | Jan. 4, 1972 |
| [73] | Assignee | Eaton Yale & Towne Inc.<br>Cleveland, Ohio |

[54] FLUID-COOLED TORQUE-TRANSMITTING DEVICE
6 Claims, 5 Drawing Figs.

[52] U.S. Cl. .................................................. 188/264 D,
188/367, 192/88 B, 192/113 B
[51] Int. Cl. .............................................. F16d 65/82
[50] Field of Search ........................................... 188/367,
264 D; 192/79, 88 B, 113 B

[56] References Cited
UNITED STATES PATENTS

| 2,870,891 | 1/1959 | Eakin et al. | 192/88 B |
| 1,996,194 | 4/1935 | Durst | 188/264 D |
| 2,195,130 | 3/1940 | Hoyt | 188/264 D |
| 3,450,242 | 6/1969 | Heidrich | 188/367 X |

FOREIGN PATENTS

| 802,800 | 6/1936 | France | 188/264 D |

*Primary Examiner*—George E. A. Halvosa
*Attorney*—Yount and Tarolli

ABSTRACT: A fluid-cooled torque-transmitting device transmits torque between relatively rotatable assemblies. One relatively rotatable assembly includes an inflatable member and a plurality of segments. The segments are movable radially upon inflation of the inflatable member to frictionally engage a portion of the other relatively rotatable assembly. The segments define a portion of a cooling chamber. Cooling fluid passes through the cooling chamber to receive the heat generated by the transmission of torque between the relatively rotatable assemblies and carry the heat therefrom.

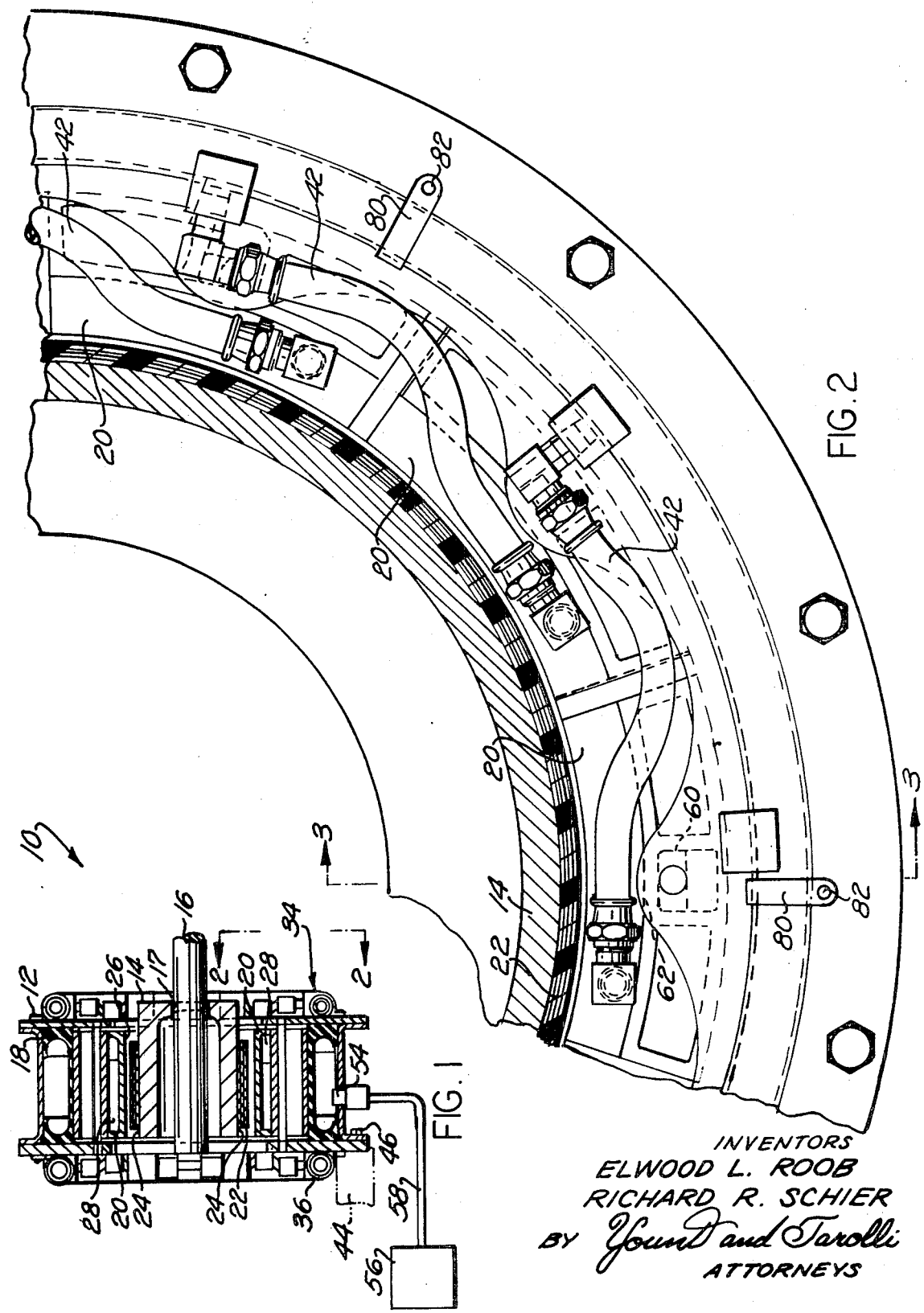

INVENTORS
ELWOOD L. ROOB
RICHARD R. SCHIER

BY Yount and Tarolli
ATTORNEYS

PATENTED JAN 4 1972 3,631,943

INVENTORS
ELWOOD L. ROOB
RICHARD R. SCHIER
BY
Yound and Tarolli
ATTORNEYS

FLUID-COOLED TORQUE-TRANSMITTING DEVICE

The present invention relates to a torque-transmitting device for transmitting torque between relatively rotatable assemblies, and more particularly relates to a fluid-cooled torque-transmitting device.

Fluid-cooled torque-transmitting devices are known. One such torque-transmitting device is shown in Eames U.S. Pat. No. 3,007,555. The prior art torque-transmitting devices having fluid-cooling provisions have included seals between relatively rotatable parts thereof. Such seals complicate the design and are subject to deterioration. The designs of the prior art have not been as efficient as possible in effecting cooling due to the particular manner in which the cooling fluid is flowed therethrough.

The immediate invention provides an improved device and includes a plurality of segments which are movable radially upon inflation of the inflatable member to frictionally engage a relatively rotatable assembly. The segments define a portion of the cooling chamber and means are provided to circulate a cooling medium through the chamber such that the heat generated by the frictional engagement of the segments with the relatively rotatable assembly is received by the cooling medium and carried from the segments. Since the segments are radially spaced about the circumference of the relatively rotatable assembly the cooling chamber is broken into a number of separate portions. Each of these portions have their own inlet and outlet for the cooling medium and as a result the heat generated by the frictional engagement of the segments in the relatively rotatable assemblies is more uniformly removed therefrom by the cooling medium. The segments of the torque-transmitting device of the present invention are mounted such that they are stationary in the circumferential direction movable radially with respect to the relatively rotatable assembly.

The complicated sealing arrangement required by the prior art is eliminated since the segments are connected to the cooling fluid inlet and outlet manifold by flexible tubes. The cooling medium passes through the flexible tubes which allow for radial movement of the segments without requiring any complicated sealing mechanism. The present invention also provides friction material about the entire circumference of the relatively rotatable assembly such that the friction material is evenly worn by the segments.

Accordingly, it is an object of the present invention to provide a new and improved torque-transmitting device for transmitting torque between relatively rotatable assemblies and wherein the heat generated by frictional engagement between the relatively rotatable assemblies is efficiently dissipated by means of a cooling medium passing through one of the assemblies.

Another object of the present invention is to provide a new and improved device for transmitting torque between relatively rotatable assemblies wherein one of the relatively rotatable assemblies is nonrotatably mounted and includes means for circulating a cooling medium therethrough for carrying away heat generated by friction between the relatively rotatable assemblies when in frictional engagement.

Yet another object of the present invention is to provide a new and improved torque-transmitting device for transmitting torque between relatively rotatable assemblies in which the friction material on one of the relatively rotatable assemblies extends about the entire circumference of that relatively rotatable assembly such that it is evenly worn when the relatively rotatable assemblies are transmitting torque therebetween.

Yet another object of the present invention is to provide a new and improved device for transmitting torque between relatively rotatable assemblies in which one of the relatively rotatable assemblies includes a plurality of segments movable radially to frictionally engage a portion of the other relatively rotatable assembly and in which the segments define a cooling chamber and means are provided for circulating a cooling medium through the cooling chamber.

A further object of the present invention is to provide a new and improved device for transmitting torque between relatively rotatable assemblies wherein one of the relatively rotatable assemblies includes a plurality of segments defining a cooling chamber in which the torque transmitting device includes flexible tubes for connecting the segments to a source of cooling medium and flexible tubes for conducting the cooling medium from the segments.

Other objects, advantages and features of the present invention will be apparent to those skilled in the art to which it relates from the following detailed description made with reference to the accompanying drawings forming a part of the specification and in which:

FIG. 1 is a cross-sectional view of fluid-cooling torque-transmitting device of the present invention;

FIG. 2 is a fragmentary end view of the torque-transmitting device of the present invention shown in FIG. 1;

Figure 3:
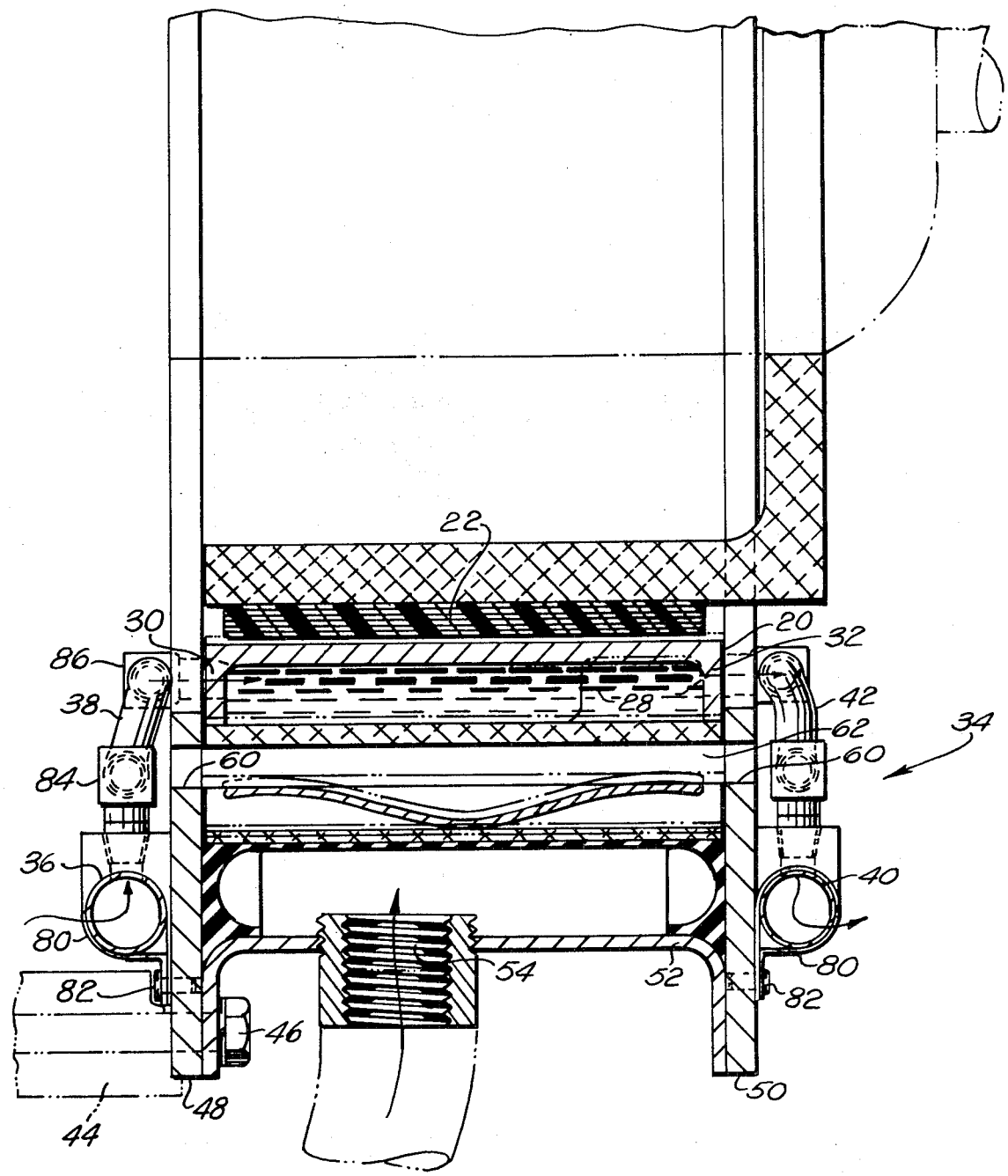
FIG. 3 is a fragmentary expanded view of the torque-transmitting device shown in FIG. 1.

The present invention provides a torque-transmitting device for transmitting torque between relatively rotatable assemblies. One of the relatively rotatable assemblies has an inflatable member and a plurality of segments which move radially upon inflation of the inflatable member. When the segments are so moved by the inflatable member, they frictionally engage the other relatively rotatable assembly so that torque is transmitted therebetween. A friction material extends about the entire circumference of the other relatively rotatable assemblies so that the segments wear the friction material in a uniform manner. The segments define a cooling chamber through which a cooling medium removes the heat generated by frictional engagement between the relatively rotatable assemblies and maintain the temperature of the friction surface at a uniform temperature. Flexible tubes are provided to connect the cooling chambers to a manifold to supply and remove cooling medium from the cooling chambers such that the segments may move radially with respect to each other. The segments may be mounted such that they are nonrotatable and thus the flexible tubes provide a positive connection which is relatively leak proof and easy to manufacture. The present invention may be applied to torque-transmitting devices of a wide variety of constructions and designs for purposes of illustration described in the drawings as applied to a torque-transmitting device 10 as shown in FIG. 1 which includes relatively rotatable assemblies 12 and 14.

A specific form of the preferred embodiment is shown in FIG. 1 in which the relatively rotatable assembly 12 is nonrotatably mounted. The torque-transmitting device 10 serves to operate as a brake such that rotation of the shaft 16 is restrained when the torque transmitting device 10 is activated. The other relatively rotatable assembly 14 is secured to the shaft 16 by any suitable means such as the key 17. When the torque-transmitting device 10 is activated and the segments 20 of the relatively rotatable assembly 12 move toward and frictionally engage the other relatively rotatable assembly 14, rotation of the shaft 16 is thereby retarded.

The relatively rotatable assembly 12 includes an inflatable member 18 extending about the circumference of the other relatively rotatable assembly 14. The relatively rotatable assembly 12 also includes a plurality of segments 20 each having a friction surface 26.

The other relatively rotatable assembly 14 includes a friction material 22 secured to its outer peripheral portion 24. When the segments 20 are moved radially by the inflatable member 18 the friction surfaces 26 of the segments 20 frictionally engage the friction material 22 such that torque is transmitted between the relatively rotatable assemblies 12 and 14.

Figure 4:
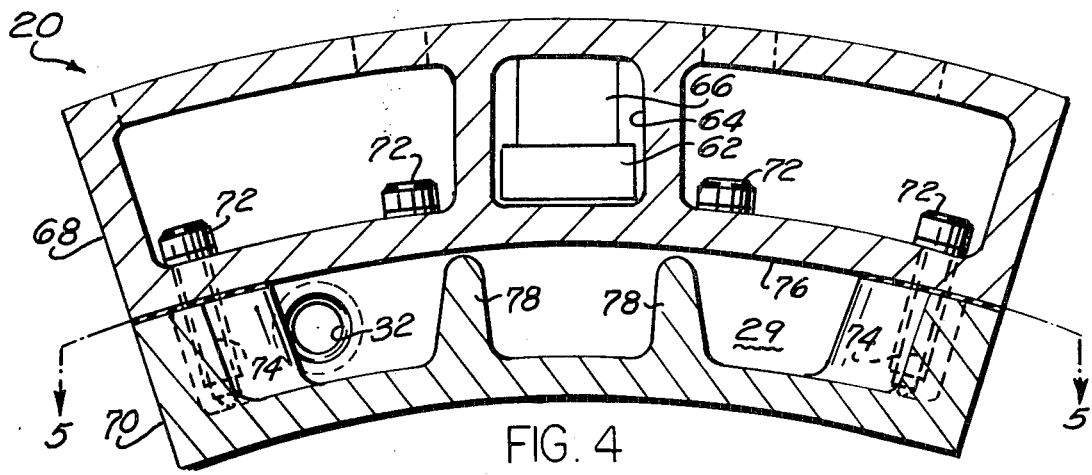
FIG. 4 is a fragmentary cross-sectional view of a portion of the torque-transmitting device shown in FIG. 3 taken along the line 4—4 thereof.
Figure 5:
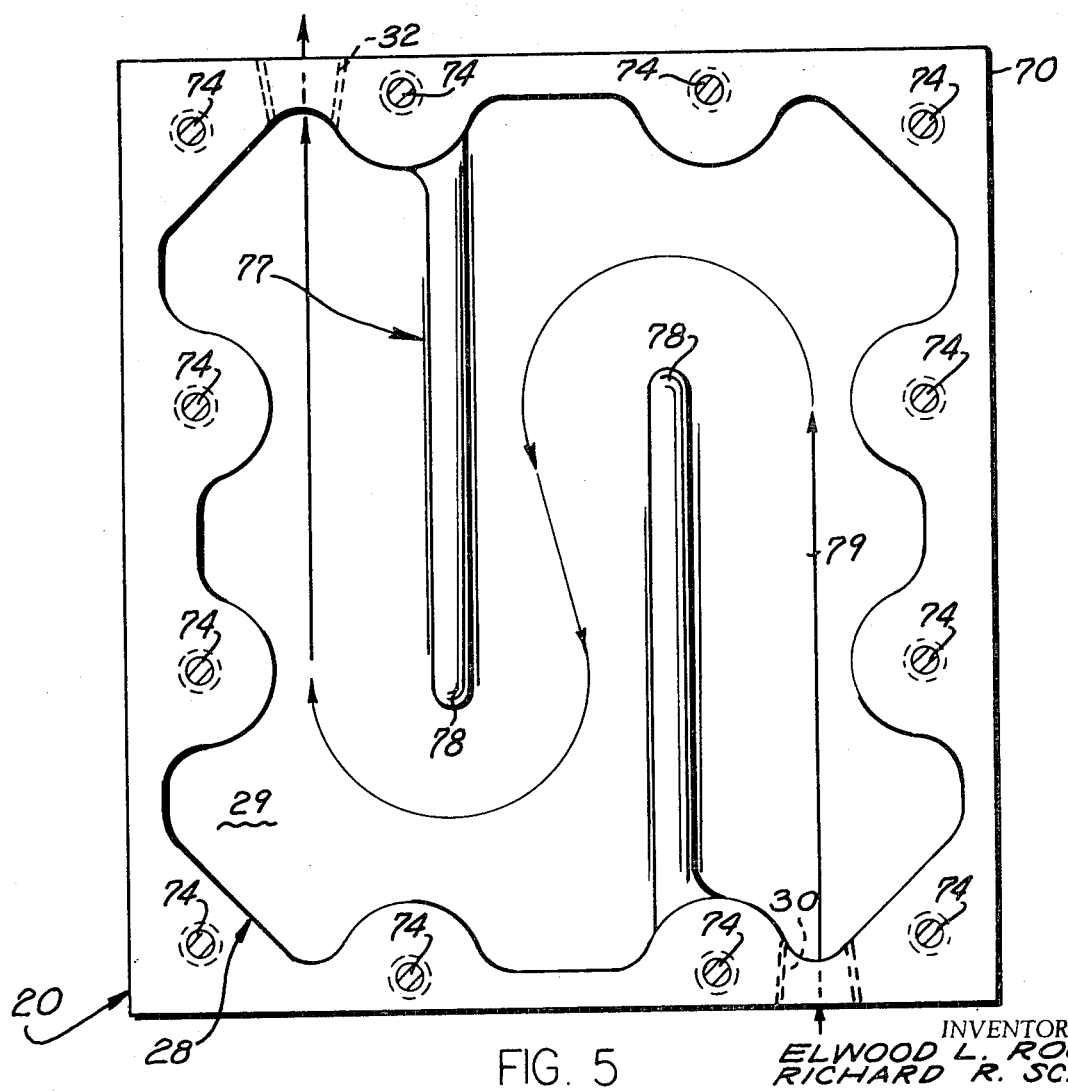
FIG. 5 is a cross-sectional view of a portion of the torque-transmitting device shown in FIG. 4 taken along the line 5—5 thereof.

The heat generated by such frictional engagement is received and conducted from the relatively rotatable members by a cooling medium passing through a cooling chamber 28 in the segments 20 as seen in FIGS. 3, 4, and 5. The cooling medium is introduced into the segment 20 through an inlet 30 and after moving through the segment 20 is removed therefrom through an outlet 32.

Means 34 is provided to circulate the cooling medium through the chambers 28. The means 34 includes an inlet manifold 36 for supplying the cooling medium to the inlet 30 of each segment and is connected thereto by means of a flexible tube 38 as seen in FIG. 3. The means 34 also includes an outlet manifold 40 which receives cooling fluid from the chamber 28 through the flexible tubes 42 which are in fluid communication with the outlet 32.

The inlet manifold 36 is supplied with a pressurized cooling medium and the outlet manifold 40 is adapted to conduct the heated cooling medium to a reservoir. In other designs the cooling medium is conducted back to the inlet manifold 36 after cooling of the cooling medium. The flexible tubes 38 and 42 allow the segments 20 to move radially while maintaining their respective portions 29 of the cooling chamber 28 in fluid communications with the manifolds 36, 40 and thus, an effective fluid connection is effected between the relatively movable part without requiring complicated rotary or high tolerance seals.

The specific form of the preferred embodiment shown in the drawings shows the torque-transmitting device 10 utilized as a brake whereby the relatively rotatable assembly 12 is nonrotatable and serves to retard rotation of the other relatively rotatable assembly 14. Thus, in the disclosed embodiment the relatively rotatable assembly 12 is secured to the fixed members 44 by any conventional fastening means, such as threaded fastener 46 as seen in FIG. 3, passing through the side plate 48 of the relatively rotatable assembly 12. The side plates 48, 50 of the relatively rotatable assembly 12 extend in annular rings about the other relatively rotatable member 14. A rim 52 is secured to the side plates 48, 50 and serves to act as a backing member for the inflatable member 18 and positions the side plates 48, 50 with respect to each other. The rim 52 has an opening 54 therein for fluid communication with a source of pressurized fluid 56 as seen in FIG. 1. A conduit 58 connects the pressurized fluid source 56 to the opening 54 so that the pressurized fluid may inflate the inflatable member 18 and thus move the segments 20 in a manner hereinabove described.

The side plates 48, 50 have complimentary openings 60 for receiving a torque bar 62 therein as seen in FIGS. 2 and 3. The torque bar 62 is positioned such that the opening 64 of the segment 20 as shown in FIG. 4 receives the torque bar 62 therein. A spring 66 is also received by the opening 64 that receives the torque bar 62 and is positioned centrally in the segment 20. The spring 66 contacts the torque bar 62 and the one side defining the opening 64 of the segment 20 to provide a yieldable force thereon. The spring 66 urges the segment 20 away from the other relatively rotatable member 14 such that relatively rotatable members 12, 14 are not normally in frictional engagement with each other.

The segment 20 is defined by an outer member 68 and an inner member 70. The outer member 68 is secured to the inner member 70 by any conventional means such as fasteners 72. The fasteners 72 extend through openings in the outer member 68 and threadedly engage the threaded openings 74 in the lower member 70.

The upper member 68 has a lower surface 76 a portion of which is in communication with the lower member 70. The upper portion of the cooling chamber is defined by the lower surface 76 of the upper member 68 and since the upper member 68 is secured to the lower member 70, the fluidtight seal therebetween is effective to prohibit cooling medium from seeping from the surfaces of the upper and lower members 68, 70.

The lower member 70 has a baffle means 77 for directing the cooling medium in the cooling chamber 28. The baffle means 77 includes the vanes 78 therein such that the flow of the cooling medium introduced into the cooling chamber 28 which is defined by a cavity in the lower member 70 absorbs a significant amount of heat therefrom. After the cooling medium is introduced through the inlet 30 into the cooling chamber 28 the vanes 78 control the direction of flow of the cooling medium as it passes through the chamber 28 and out of the cooling chamber 28 through the outlet 32. By requiring the cooling medium to pass through the winding path shown at 79 in FIG. 5 a significant amount of heat is received by the cooling medium.

The cooling medium is supplied to the inlet 30 from a fluid supply which is secured to the inlet manifold 36. The inlet manifold 36 extends about the circumference of the side plate 48 and is secured therethrough by the straps 80 and fastening means 82. The fluid supply provides the cooling medium to the manifold 36 under pressure and in sufficient quantity to maintain sufficient flow through the segments 20 to conduct heat therefrom.

A coupling 84 is provided to connect the inlet manifold 36 to the flexible tube 38. A fitting 86 is also provided to connect the flexible tube 38 to the inlet 30 such that flexible fluid communication exists between the inlet manifold 36 and the segment 20 as best seen in FIG. 3. This flexible connection is essential since the segment must move radially upon inflation of the inflatable member 18. The flexible tube 38 allows such radial movement while maintaining fluid communication between the manifold 36 and the segment 20.

It should be understood that the outlet manifold 40 is connected to the outlet 32 of the segments in a similar manner as described in connection with inlet 30 with its respective flexible tube 42 maintaining fluid communication between the outlet 32 of the segment 20 and the outlet manifold 40. The configuration of the flexible tubes 42 is more clearly shown in FIG. 2 and it should be understood that the tubes 38 have a similar configuration. The fluid supplied in the inlet 30 of the segment 20 is removed through the outlet 32. The cooling medium proceeds from the outlet manifold 40 to a reservoir, recirculated through the inlet manifold 36 or removed from the outlet manifold 40 in any manner well known to those skilled in the art.

In operation, the torque-transmitting device 10 of the disclosed embodiment serves to operate as a brake. When pressurized fluid is permitted to flow from the source 56 through the conduit 58 into the inflatable member 18, the segments 20 move in a radial direction such that their frictional surfaces 26 contact the friction material 22 of the other relatively rotatable member 14. It should be understood that the pressurized fluid provides sufficient fluid pressure inside the inflatable member 18 to overcome the yieldable opposition of the spring 66 biasing the segments 20 into a disengaged position and create sufficient radial forces on the segments to provide a braking force on the other relatively rotatable member 14. As torque is transmitted between the relatively rotatable members 12, 14, heat is generated by such frictional engagement.

In order to carry this heat from the torque-transmitting device 10, the cooling medium is supplied to the segments 20 through the inlets 30. Means are provided to circulate the cooling medium through the cooling chambers 28 and include the inlet manifold 36 which is connected to the cooling chamber 28 of the segments 20 by means of flexible tubes 38. The cooling medium is removed from the chambers 28 through the outlets 32 which are connected to an outlet manifold 40 by means of flexible tubes 42. It should be understood that the flexible tubes 38, 42 operate so as to allow the segments 20 to move radially without requiring any complicated fluid connections. As the cooling medium passes through the cooling chamber 28 the heat generated by the friction is received by the cooling medium and carried therefrom as it leaves the chamber.

When the pressurized fluid is no longer supplied through the conduit 58 into the inflatable member 18 the segments 20 move to a disengaged position by the yieldable force created by the spring 56. Thus the inflatable member 18 is deflated and moved to a position whereby the relatively rotatable assemblies 12, 14 are no longer in frictional engagement.

By providing such a torque-transmitting device 10 multiple cooling chambers are provided in the segments 20 to allow a more uniform cooling of the torque-transmitting device 10. The flexible tubes 38, 42 connecting the manifold 36, 40 to the segments 20 allow radial movement of the segments 20 without complicated hydraulic connections. Since the cooling medium is circulated through the stationary part 12 other complicated fluid connections with a supply of cooling medium are no longer required. In addition such a design provides friction material 22 extending about the entire circumference of the other relatively rotatable member 14 such that the segments 20 uniformly wear the friction material 22.

Having described our invention, what we claim is:

1. A torque-transmitting device comprising a fixed assembly and a rotatable assembly, said fixed assembly comprising an inflatable member carrying a plurality of a torque-transmitting segments which are radially movable upon inflation of said inflatable member, an inlet manifold for connection to a source of pressurized cooling fluid and an outlet manifold, certain of said segments having cooling chambers therein, said chambers individually connected to said manifolds by means of flexible tubing for cooling fluid communication therebetween regardless of segment radial position, said rotatable assembly comprising a torque transmitting surface radially spaced from said segments for engagement by said segments upon inflation of said inflatable member.

2. The torque-transmitting device of claim 1 wherein said segments and said surface carry friction material for frictional engagement therebetween upon inflation of said inflatable member.

3. The torque-transmitting device of claim 2 wherein said segment carried friction material is arcuate in configuration.

4. A torque-transmitting device as defined in claim 1 wherein said cooling chambers of said certain segments have an inlet connected by said flexible tubing to said inlet manifold, an outlet connected by said flexible tubing to said outlet manifold and baffle means interposed between said inlet and outlet for circulating said cooling fluid throughout said segments such that the heat created by said segment and surface engagement is substantially removed as the cooling fluid leaves said segments through said outlets.

5. A torque-transmitting device as defined in claim 4 wherein said segments include means for yieldably urging said segments away from said surface such that said segments disengage said surface when said inflatable member is deflated.

6. A torque-transmitting device as defined in claim 5 wherein said fixed assembly circumferentially surrounds said rotatable assembly and said segments move radially inwardly to engage said surface upon inflation of said inflated member.

* * * * *